United States Patent [19]

Haubner et al.

[11] 4,378,769

[45] Apr. 5, 1983

[54] DIGITAL IGNITION CONTROL FOR A MAGNETOPOWERED IGNITION SYSTEM OF AN INTERNAL COMBUSTION ENGINE

[75] Inventors: Georg Haubner, Berg; Jürgen Wesemeyer, Nuremberg; Werner Meier, Rednitzhembach; Hans Schrumpf, Oberasbach, all of Fed. Rep. of Germany

[73] Assignee: Robert Bosch GmbH, Stuttgart, Fed. Rep. of Germany

[21] Appl. No.: 235,758

[22] Filed: Feb. 18, 1981

[30] Foreign Application Priority Data

Feb. 20, 1980 [DE] Fed. Rep. of Germany ....... 3006288

[51] Int. Cl.³ .......................... F02P 1/00; F02P 3/02; F02P 5/04
[52] U.S. Cl. .................................. 123/416; 123/417; 123/418; 123/421; 123/599
[58] Field of Search ............... 123/416, 417, 418, 421, 123/598, 599

[56] References Cited

U.S. PATENT DOCUMENTS

| | | | |
|---|---|---|---|
| 3,923,021 | 12/1975 | Stark ................................... | 123/416 |
| 4,009,669 | 3/1977 | Hetzlar et al. ...................... | 123/416 |
| 4,231,332 | 11/1980 | Wrathall ............................. | 123/416 |
| 4,244,023 | 1/1981 | Johnson .............................. | 123/417 |
| 4,244,339 | 1/1981 | Gorille ................................ | 123/416 |
| 4,262,644 | 4/1981 | Walker et al. ...................... | 123/416 |
| 4,267,810 | 5/1981 | Wesenmeyer et al. ............. | 123/416 |

*Primary Examiner*—Raymond A. Nelli
*Attorney, Agent, or Firm*—Frishauf, Holtz, Goodman & Woodward

[57] ABSTRACT

In an ignition system for an internal combustion engine, a digital system for computing the timing advance is provided. Constants approximating the curve of timing advance v. engine speed are stored in a microprocessor. The positive half waves of primary current in the magneto generate the ignition energy and also generate a reference signal for controlling the actual ignition time. The sequence of reference signals is also used to generate a digital value indicative of engine speed. The latter is used to address the read only memory in which the constants for approximating the timing advance curve are stored. After each reference signal, the value read out from the read only memory is counted down by a counter. When the counter reaches the value of zero, ignition is started.

11 Claims, 6 Drawing Figures

DIGITAL IGNITION CONTROL FOR A MAGNETOPOWERED IGNITION SYSTEM OF AN INTERNAL COMBUSTION ENGINE

CROSS-REFERENCE TO RELATED APPLICATIONS AND PUBLICATIONS (1) U.S. application Ser. No. 869,617;
    filed: Jan. 16, 1978;
    Corresponding to DE-OS No. 27 01 750;
(2) DE-OS No. 27 01 750.

The present invention relates to magneto-powered ignition control systems for internal combustion engines. Particularly, it concerns control systems which advance the ignition timing as a function of engine speed.

BACKGROUND OF THE INVENTION

In the known magneto ignition control systems, the ignition timing is fixed by analog circuits which include RC circuits as well as an ignition transistor which, in the conductive state, allows ignition current to flow through an ignition coil and which, when blocked, interrupts the ignition current thereby causing a spark to be generated. Each component in an analog circuit of course has predetermined tolerances and, further, the characteristics thereof change with temperature. Thus, the ignition timing as a function of engine speed also has an undesired variation with respect to temperature. It is thus difficult to match an analog system to the requirements of an internal combustion engine.

THE INVENTION

It is an object of the present invention to allow the approximation of the curve of ignition timing v. motor speed to any desired accuracy and to have this approximation be independent of temperature. It is a further object of the present invention to achieve this end while utilizing signals already present in the equipment in particular the speed dependent signals furnished by a magneto generator that both powers and times ignition.

In accordance with the present invention, a digital control system is provided which includes a speed counter, a timing counter, a storage such as a read only memory, and a control unit. When the magneto AC voltage utilized as a speed sensor, reaches a predetermined point in the cycle, a control unit (arithmetic unit) of the digital system is triggered to start the speed counter. A sequence of clock signals is fed into the speed counter which is maintained in the counting state for one complete cycle. The count on the counter thus is inversely proportional to engine speed. At the end of the cycle, the central arithmetic unit addresses the ROM with the count on the counter and a constant signifying the desired advance in ignition timing is read out from the so-addressed storage location. This signal is applied to the timing counter which then is activated to count down at a fixed clock signal frequency. When the count down is completed, the signal initiating the spark is generated.

Preferably, the speed counter is operated to count in one cycle, for example, at the start of the positive half wave generated by the magneto. At the start of the next subsequent positive half wave, the contents of the counter are utilized to address the read only memory and for processing as a function of other external parameters if desired.

DESCRIPTION OF THE PREFERRED EMBODIMENT

Figure 1:
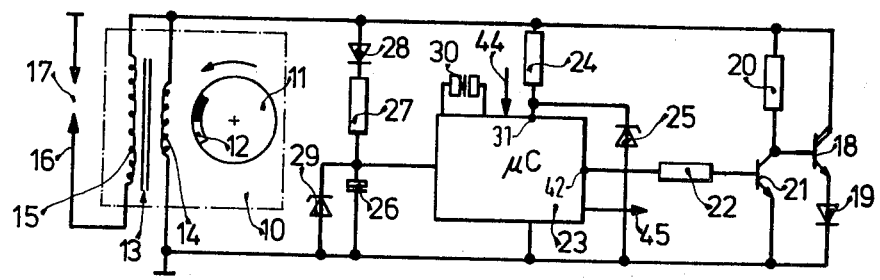
FIG. 1 is a partially schematic diagram of a transistorized ignition circuit for a power saw utilizing a magneto and a microprocessor.

FIG. 1 shows an ignition circuit for a one cylinder internal combustion engine for a saw. It includes a magneto 10 and a transistorized ignition circuit. Magneto 10 includes a magnet wheel 11 which is driven by the internal combustion engine. A permanent magnet 12 is embedded into the magnet wheel at its periphery. An ignition armature 13 is fixedly mounted and is penetrated by the magnetic field of permanent magnet 12 once during each revolution of the wheel. The ignition armature 13 consists of a primary winding 14 and a secondary winding 15. One end of secondary winding 15 is connected to one end of primary winding 14, while its other end is connected through an ignition cable 16 to a spark plug 17. One end of primary winding 14 is connected to reference or ground potential while its other end is connected to an ignition transistor 18 whose emitter-collector circuit is connected in series with a protective diode 19. The base of transistor 18 is connected to its collector through a resistor 20. A control transistor 21 has an emitter-collector circuit connected in parallel with the base-emitter circuit of transistor 18 forming a Darlington circuit. The base of transistor 21 is connected through a resistor 22 to the output of a microprocessor 23. The input of microprocessor 23 is connected to the collector of transistor 18 and one end of primary winding 14 through a resistor 24. It is also connected to reference potential through a Zener diode 25. The latter protects the circuit from other-voltages. The current for energizing microprocessor 23 is derived from a capacitor 26 which is connected through a resistor 27 and a diode 28 to the primary winding of the ignition armature. A Zener diode 29 is connected in parallel with capacitor 26 and also provides over-voltage protection. High frequency oscillations are applied to microprocessor 23 from a quartz crystal 30.

Figure 2:
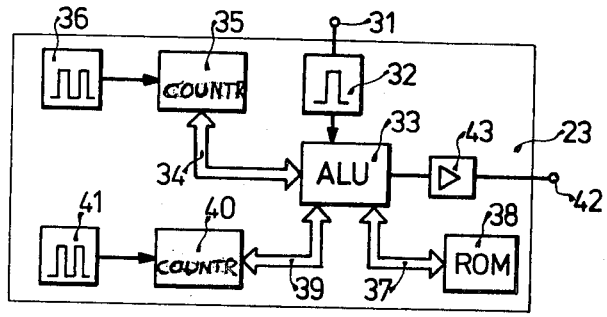
FIG. 2 is a block diagram illustrating the components of the microprocessor.

FIG. 2 shows the construction of microprocessor 23 in block diagram form. Input 31 which is connected to resistor 24 is connected to a pulse forming stage 32. The output of the latter is applied to the central processing unit 33. The central processing unit includes arithmetic and logic elements. It is connected through a bus 34 to a counter 35. A 6 Kc clock pulse generator 36 is connected to counter 35. The clock pulse generator derives its input oscillations from the above-mentioned quartz crystal 30. Central processing unit 33 is also connected through a bus 37 to a read only memory 38. Read only memory 38 contains, in specified storage locations, the constants which are required for the approximation of the spark timing advance versus engine speed curve. Specifically, the required timing advance is read out from ROM 38 when this memory is addressed by a number signifying the then present engine speed. A further counter 40, herein referred to as a timing counter, is connected through a bus 39 to the central processing unit. A 200 Kc clock generator 41 is provided for counter 40. Output 42 of microprocessor 23 is connected to the central processing unit 33 by means of an amplifier 43. Buses 34, 37 and 39 transmit digital data, addresses, and commands.

OPERATION

Figure 4:
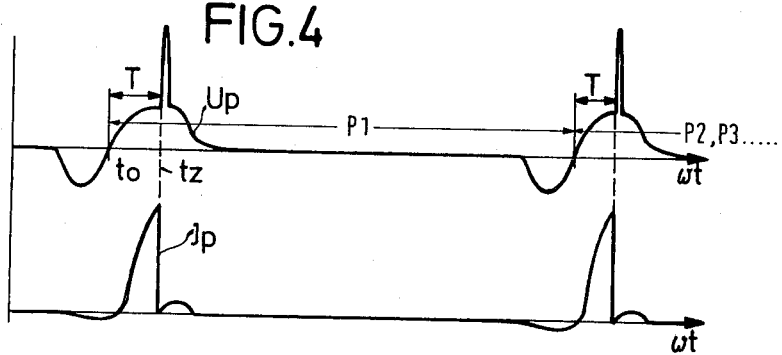
FIG. 4 show the variation of voltage and current in the primary winding of the ignition coil.
Figure 3:
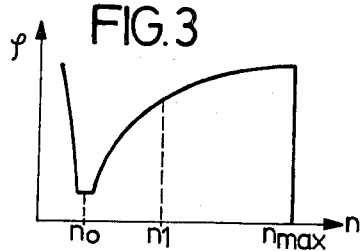
FIG. 3 illustrates the desired ignition timing advance v. engine speed.

The operation of the ignition system shown in FIG. 1 will be explained with the aid of the diagrams of FIGS. 3, 4 and 5. FIG. 3 illustrates the required ignition timing advance as a function of speed of the internal combustion engine. It illustrates the timing advance angle as measured from top dead center as a function of engine speed (n). The smallest angle is present at idling speed ($n_0$). The angle is set to optimize the engine exhaust when idling. The idling speed ($n_0$) is stabilized in that a greater timing advance of the ignition timing is provided if the idling speed decreases. This causes the motor to be reaccelerated to the desired idling speed. In the operating region of the internal combustion engine, the timing advance increases with increasing speed according to the curve shown in FIG. 3 until a maximum allowable engine speed is reached. The slope of the curve is adjusted for optimum motor power output. When the maximum allowable engine speed is reached, the timing advance angle is rapidly decreased to zero. This means that the power output of the motor is sharply reduced when the maximum allowable speed is reached. As previously mentioned, the constants required for approximating the curve shown in FIG. 3 are stored in a digital code in storage 38 of microprocessor 23.

When the engine is started, permanent magnet 12 induces a positive and negative voltage half wave in the primary circuit during each rotation. The variation of voltage induced in the primary winding is shown in FIG. 4 as a function of rotational angle $\omega t$. During the negative half wave, transistor 18 is blocked and capacitor 26 is not being charged since diode 28 is in the blocked state. At the start of the positive voltage half wave, transistor 18 is switched to the conductive state at time $t_0$ via resistor 20. Simultaneously, the voltage across the primary winding is applied through resistor 24 to pulse-forming stage 32 of microprocessor 23. A first reference pulse is now generated in stage 32. This reference pulse is applied to the central processing unit 33 and through bus 34 to counter 35. Counter 35 starts to count at the rate determined by clock pulse generator 36. The counter remains activated throughout one complete rotation of magnet wheel 11 (Period $P_1$). Only following the second reference signal, that is the pulse furnished by pulse-forming stage 32 at time $t_0$ of the next positive voltage half wave, is a signal applied to counter 35 to stop it from counting. Since the time between two successive reference pulses is inversely proportional to the speed of the internal combustion engine, the count on counter 35 resulting from counting throughout one revolution at a predetermined frequency of 6 Kc is a digital signal which signifies engine speed. It is applied through bus 34 to the central processing unit 33. Receipt of the second reference signal also causes central processing unit 33 to switch in timing counter 40 via bus 39. Also, the number on counter 35 is used to address ROM 38 through bus 37. A value of timing advance is read out in form of a digital number from storage 38. As previously explained, this therefore corresponds to the then-present speed of the internal combustion engine. If necessary, the timing advance value is transformed (i.e. recoded) into a timing signal in form of a binary number signifying large and small time increments in central processing unit 33. This will be discussed with reference to FIG. 6. The binary number is applied via bus 39 to timing unit 40. Timing unit 40 contains a counter which is preset to the binary number. Simultaneously, the counter is connected to clock pulse generator 41 by central processing unit 33. The counter in unit 40 commences to counddown. When it reaches the value of zero, the time $t_z$ in FIG. 4 is reached. The signal that the counter in unit 40 has reached the count of zero is transmitted to central processing unit 33. The latter then furnishes an ignition starting signal at terminal 42. The ignition starting signal causes transistor 21 to be switched to a fully conductive state. This blocks transistor 18 and thereby interrupts the current through primary winding 14 of the ignition armature. The variation of current in the primary winding is shown in FIG. 4, line 2. It will be noted that the current is abruptly interrupted at time $t_z$. This interruption of current in the primary winding causes a high voltage pulse to be induced in the secondary winding. A spark therefore is generated at spark plug 17.

Counter 35 remains at the count reached at the end of the first rotation throughout the subsequent rotation (Period $P_2$) of magnet wheel 11. Counter 35 is thus reset at the start of alternate positive voltage half waves and is supplied with the clock pulses furnished by clock pulse generator 36 throughout the first period $P_1$. At the start of the next following positive voltage half wave, (start of period $P_2$), its contents are applied as a speed indicative signal to central processing unit 33. The speed of the internal combustion engine is thus remeasured for every other rotation of magnet wheel 11 and then is utilized for computing the actual ignition timing for the next two rotations of magnet wheel 11. Since ROM 38 has a timing advance value in each storage location addressable by the digital signal signifying engine speed and since this timing advance value is transformed into a timing signal and then applied to timing unit 40 in response to each reference signal, ignition transistor 18 is switched to the non-conductive state a time interval T following time $t_0$ in each period. As mentioned above, central processing unit 33 causes the reverse counter in timing unit 40 to count down at the frequency of clock pulse generator 41 from the value (timing signal) set by central processing unit 33. In a preferred embodiment, the pulses furnished by clock signal generator 41 occur at time increments of five microseconds. A predetermined number of these clock pulses thus signify a particular time interval T from the start of the positive half wave to the ignition time.

Figure 5:
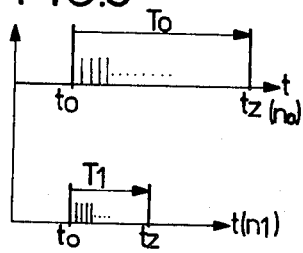
FIG. 5 illustrates the timing signal computed by the microprocessor from the start of the AC voltage half wave until the ignition time at idling speed and at an intermediate speed of the motor.

In FIG. 5, the above-mentioned time interval is shown for an idling speed $n_0$ and an actual speed under load $n_1$. At the idling speed the time interval $T_0$ is 150 microseconds. When the reference signal appears at time $t_0$, the reverse counter in counter 40 is set to the number 30 by central processing unit 33. The number 30 was derived from the value read out from read only memory 38. Following a count-down of 30 counts furnished by clock pulse generator 41, transistor 18 is switched to the blocked state. Since 30 time increments of 5 microseconds each have elapsed, the total time interval is 150 microseconds. At a speed $n_1$, the counter in counter 40 is is set by central processing unit 33 to the number 10. Counting down for 10 intervals of 5 microseconds each causes the complete time interval $T_1$ to be 50 microseconds.

It is also possible to apply additional values to central processing unit 33. For example, these may be sensed values which signify the then present operating conditions such as the torque delivered by the engine or the temperature. The value derived from ROM 38 can then be corrected in accordance with the then present load or temperature. It is also possible to store information in read only memory 38 which causes every other ignition signal to be suppressed when the maximum allowable speed of the internal combustion engine has been reached. This suppression of alternate ignition initiation signals leads to a very safe speed limiting even when the internal combustion engine is operating without load. It is also possible that additional outputs such as output 45 be provided so that additional functions, such as for example greasing of particular parts of the saw, may be generated by the central processing unit.

Figure 6:
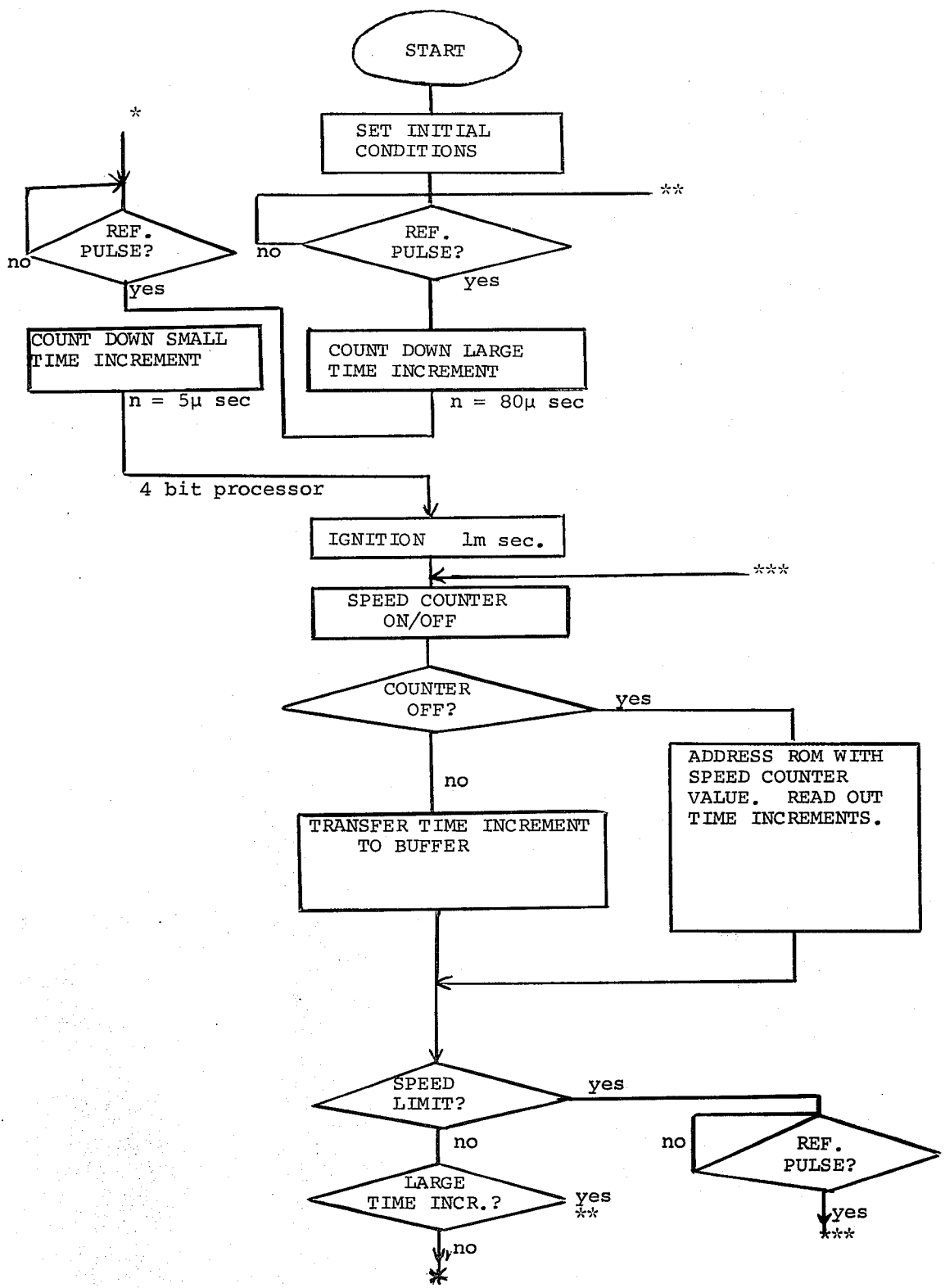
FIG. 6 is the flow chart for the microprocessor of FIG. 1.

The operation of the microprocessor is further illustrated by the flow chart of FIG. 6. The program is started as soon as the supply voltage is applied. The initial conditions are then set, that is, registers are set and reset as required. It is then tested whether pulse forming stage 32 is furnishing a reference pulse. If no, the test is repeated periodically. However, if a reference pulse is present, the value set in timing unit 40 for large time increments, that is at slow speeds, is counted down. Following this count down, the value for the small increments also set in the previous cycle in timing unit 40 is counted down. The two separate steps are necessary because the microprocessor of the example is a four bit processor. If a larger capacity microprocessor were used, the count down would take place in a single step as explained relative to timing unit 40 above. At the end of the count down ignition takes place.

Also in response to each reference pulse, speed counter 35 is either switched on or off. It is then tested whether the counter has been turned on or off. If the counter has been turned off, the count on it is used to address ROM 38 and the digital number signifying the timing advance is read out. For this application, this timing advance is a number containing digits indicative of a large time increment and digits indicative of small time increments as noted above. The values read out from the ROM are then tested as to whether they do or do not correspond to a speed exceeding the maximum permissible speed. If yes, the test for reference pulse is carried out and when a reference pulse is found, the program returns to that portion which affects the speed counter. The ignition is thus suppressed in the next cycle or period. If the speed is within proper limits, the test is carried out whether the large time increments are present, that is whether it is within a predetermined low speed range. If yes, the program returns to the next test for reference pulse which initiates the count down of both large and small time increments. If no, the program returns to the reference pulse test which includes the count down of small time increments only. Again, if a microprocessor with a larger capacity were used, it would only be necessary to count down one set of time increments, i.e. the decision as to whether or not large time increments were present could be omitted from the flow chart.

The invention is not to be limited to the particular embodiments shown. For example, the reference signal can be generated by an electromagnetic sensor which also furnishes a signal for each rotation of magnet wheel 11 to the input of microprocessor 23. The current supply for microprocessor 23 can also be derived from a separate battery.

Various changes and modifications may be made within the scope of the inventive concepts.

We claim:

1. In an ignition system for an internal combustion engine having a magneto generator driven by said engine for powering and timing ignition for said engine, said magneto generator having an AC voltage wave output of a repetition rate corresponding to the engine speed, and means for creating a spark in response to a spark initiation signal: apparatus for creating said spark initiation signal comprising means (32) connected to said output of said magneto generator for deriving a reference signal at a predetermined point in each repetition of said AC voltage wave;

means (36,41) furnishing clock signals;

digital speed counter means (35) for counting said clock pulses from receipt of a speed counter activating signal until receipt of a speed counter stop signal;

storage means (38) for storing a plurality of constants each signifying a desired timing advance at a given motor speed;

digital timing counter means (40) connected for activation in response to each reference signal produced by said reference signal deriving means, and digital control means (33) connected to said digital speed counter means, said storage means, and said digital timing counter means for furnishing said speed counter activating and stop signals in response to selected ones of said reference signals so that the count on said digital speed counter means upon receipt of said speed counter stop signal constitutes a motor speed specifying signal, addressing said storage means with said motor speed specifying signal, thereby reading out a count value indicative of said desired timing advance at said then present motor speed, furnishing said timing advance count value to said digital timing counter means for entry at the times of its activation by said reference signals, and furnishing said spark initiating signal when said timing counter means reaches a count indicative of the end of a time interval corresponding to said count value.

2. A system as set forth in claim 1, wherein said predetermined points in said repetitions said AC voltage wave are the starts of positive half waves.

3. A system as set forth in claim 2, wherein said digital timing counter means comprises a presettable reverse counter connected to said means for furnishing a sequence of clock signals in response to each of said reference signals; and wherein said digital control means further comprises means for presetting said presettable reverse counter to a number corresponding to each of the so read out constants in response to each of said reference signals and for furnishing said spark initiation signal when said reverse counter reaches a predetermined final count.

4. A system as set forth in claim 1, wherein said digital speed counter means, said digital timing counter means, said digital control means, and said storage means together constitute a microcomputer.

5. A system as set forth in claim 4, wherein said microcomputer further comprises said means (32) for deriving said reference signals, said deriving means having an input (31) connected to said output of said magneto generator.

6. A system as set forth in claim 5, wherein said magneto generator is equipped with a primary (14) winding and a secondary (15) winding;

wherein said spark creating means comprises a spark plug connected to said secondary winding, and controllable switch means (18,21) connected to said primary winding for interrupting current through said primary winding thereby creating said spark in response to said spark initiating signal; and wherein said control means has an input (31) connected to said primary winding, and an output (42) connected to said controllable switch means.

7. A system as set forth in claim 5, further comprising a current supply for said microcomputer, said current supply comprising a capacitor (26), a Zener diode (29) connected in parallel with said capacitor and a resistor-diode circuit connecting said capacitor to said primary winding.

8. A system as set forth in claim 5, wherein said digital control means has a plurality of inputs, each for receiving the value of a sensed parameter of said motor; and wherein said digital control means modifies said constants read out from said storage means in accordance with the so-furnished values.

9. A system as set forth in claim 8, wherein said digital computing means further furnishes a plurality of output signals for controlling selected ones of said parameters of said motor.

10. A system as set forth in claim 1, wherein said count values stored in said storage means approximate a curve of timing advance versus motor speed; and wherein said curve has a steep slope at idling speeds of said motor for stabilizing said idling speed, a slightly positive slope at normal operating speeds for achieving an optimum power output and a rapid drop in the direction of zero timing delay when the speed of said motor reaches a maximum allowable speed.

11. A system as set forth in claim 10, wherein said digital control means is constituted for suppressing alternate ones of said spark initiation signals when the speed of said motor exceeds said maximum allowable speed.

* * * * *